United States Patent [19]

Althaus

[11] Patent Number: 5,647,202

[45] Date of Patent: Jul. 15, 1997

[54] COOLED WALL PART

[75] Inventor: Rolf Althaus, Kobe, Japan

[73] Assignee: Asea Brown Boveri AG, Baden, Switzerland

[21] Appl. No.: 530,092

[22] Filed: Sep. 19, 1995

[30] Foreign Application Priority Data

Dec. 9, 1994 [JP] Japan ................. 44 43 864.8

[51] Int. Cl.[6] ................................................. F02K 11/00
[52] U.S. Cl. ....................... 60/266; 60/265; 60/752; 60/760; 165/908; 431/352
[58] Field of Search ..................... 60/265, 266, 752, 60/754, 756, 757, 758, 760; 165/134.1, 908; 416/97 R; 431/351, 352

[56] References Cited

U.S. PATENT DOCUMENTS

| | | | |
|---|---|---|---|
| 3,358,457 | 12/1967 | Caldwell et al. | 60/266 |
| 3,360,929 | 1/1968 | Drewry | 60/760 |
| 3,605,412 | 9/1971 | Stockel | 60/265 |
| 4,073,599 | 2/1978 | Allen et al. | 416/97 R |
| 4,462,754 | 7/1984 | Schofield | 416/97 R |
| 4,474,014 | 10/1984 | Markowski | 60/756 |
| 4,643,250 | 2/1987 | Niggemann et al. | 165/908 |
| 4,840,226 | 6/1989 | Richlen | 165/155 |
| 5,363,654 | 11/1994 | Lee | 165/908 |
| 5,435,139 | 7/1995 | Pidcock et al. | 60/752 |
| 5,522,217 | 6/1996 | Zauner | 60/39.45 |

FOREIGN PATENT DOCUMENTS

| | | | |
|---|---|---|---|
| 1052175 | 3/1959 | Germany. | |
| 1118539 | 11/1961 | Germany. | |
| 2550100 | 5/1976 | Germany. | |
| 2836539C2 | 5/1990 | Germany. | |
| 4244302A1 | 6/1994 | Germany. | |
| 4137638C2 | 8/1994 | Germany. | |
| 16116 | 3/1907 | Norway | 60/760 |
| 603918 | 6/1948 | United Kingdom | 60/760 |

*Primary Examiner*—Timothy Thorpe
*Assistant Examiner*—Ted Kim
*Attorney, Agent, or Firm*—Burns, Doane, Swecker & Mathis, L.L.P.

[57] ABSTRACT

In a cooled wall part having a plurality of separate convectively cooled longitudinally cooling ducts (2) running near the inner wall (1) and parallel thereto, adjacent longitudinal cooling ducts (2) being connected to one another in each case via intermediate ribs (3), there is provided at the downstream end of the longitudinal cooling ducts (2) a deflecting device (4) which is connected to at least one backflow cooling duct (6) which is arranged near the outer wall (5) in the wall part and from which a plurality of tubelets (7) extending to the inner wall (1) of the cooled wall part and arranged in the intermediate ribs (3) branch off. By means of this wall part, the cooling medium can be put to multiple use for cooling (convective, effusion, film cooling).

4 Claims, 2 Drawing Sheets

Section II-II

Section III-III

COOLED WALL PART

BACKGROUND OF THE INVENTION

1. Field of the Invention

The invention relates to a cooled wall part, for example a wall part of flow-round hot turbomachine components, such as combustion chamber walls.

2. Discussion of Background

It is known, for the cooling of combustion chamber walls for the purpose of avoiding too high material temperatures, to employ convective cooling methods. Typically, in such methods, the cooling medium flows along, on the principle of cocurrent or countercurrent to the combustion chamber flow, in a cooling duct, located between the combustion chamber inner wall and combustion chamber outer wall. Alternatively, the cooling flow may be directed through an annular gap, or in separate cooling ducts delimited from one another. These convective cooling methods can be combined, for example, with impact cooling in order to produce high coefficients of heat transmission DE 2,836,539 C2.

Moreover, cooling techniques based on a controlled introduction of air into the combustion zone are known for the cooling of combustion chamber walls. This applies, for example, to film cooling, in which the cooling medium passes through orifices in the combustion chamber inner wall into the interior of the combustion chamber. The casting medium then flows along on the inside of the combustion chamber wall and there forms a thin film which constitutes a thermal insulating layer and which reduces the heat load on the wall.

These known cooling techniques scarcely any longer meet the constantly increasing requirements as to the efficiency of gas turbine plants, the extremely high temperatures associated therewith and the as low as possible cooling-air consumption.

SUMMARY OF THE INVENTION

The invention attempts to avoid these disadvantages. Accordingly, one object of the invention is to provide a novel cooled wall part, in which the cooling medium is put to multiple uses internally for cooling and increased cooling effectiveness is thereby attained.

According to the invention, a cooled wall part has a plurality of separate convectively cooled longitudinal cooling ducts running near the inner wall and parallel thereto and, adjacent longitudinal cooling ducts are connected to one another via intermediate ribs. At the downstream end of the longitudinal cooling ducts a deflecting device which is connected to at least one backflow cooling duct is arranged near the outer wall in the wall part. A plurality of tubelets extend from the backflow cooling duct to the inner wall of the cooled wall part and are arranged in the intermediate ribs branch off.

The advantages of the invention are that the cooling medium, for example cooling air, is put to multiple use, namely, on the one hand, for convective cooling in the longitudinal cooling ducts, then for convective cooling in the tubelets extending transversely, the latter cooling constituting effusion cooling (the passage of gases through small orifices), and finally for the film cooling of the inner wall of the cooled wall part.

It is particularly expedient if the tubelets are arranged in the backflow cooling duct at right angles to the direction of flow.

It may be advantageous, furthermore, if the tubelets are arranged in the backflow cooling duct in the intermediate ribs at an angle deviating from the right angle, for example at an acute angle, to the direction of flow.

It is advantageous, moreover, if the wall part is a combustion chamber cooling brick and the combustion chamber flow flows around the inner wall of the cooled wall part.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings which illustrate exemplary embodiments of the invention and wherein.

Figure 1:
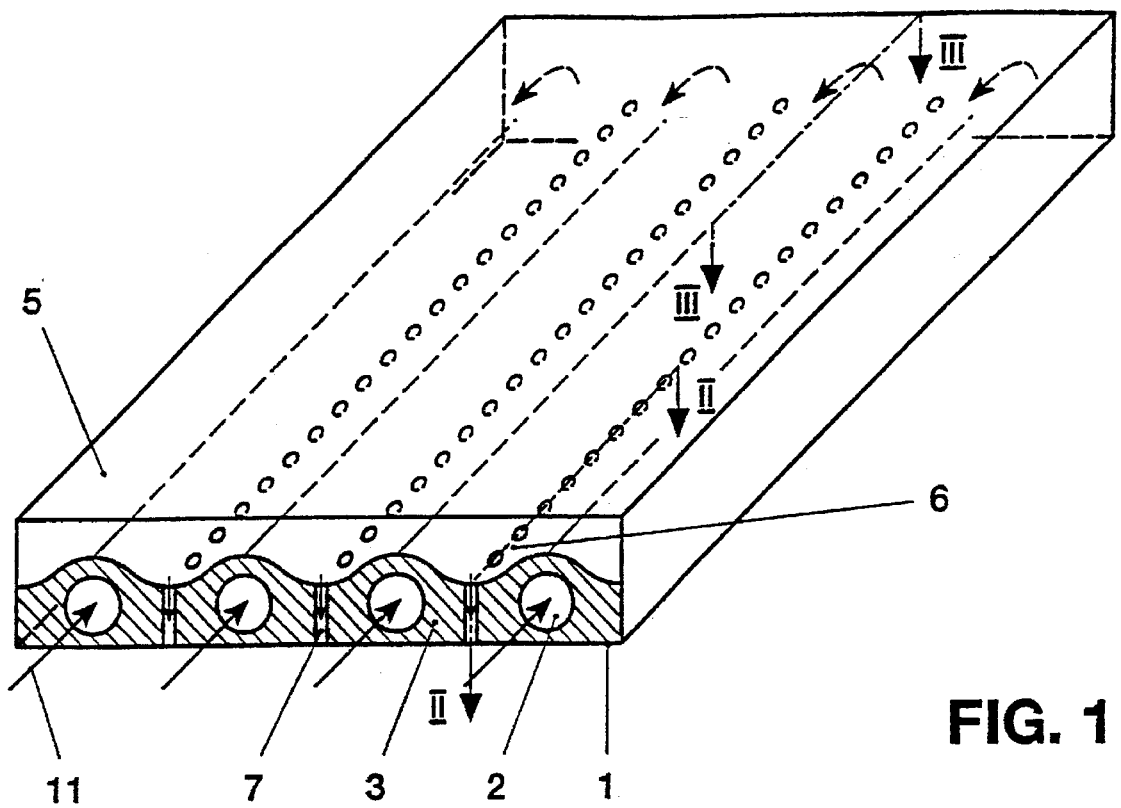
FIG. 1 shows a perspective representation of a cooled wall part according to the invention.

Only the elements essential for understanding the invention are shown. The direction of flow of the media is designated by arrows.

DETAILED DESCRIPTION

Referring now to the drawings, wherein like reference numerals designate identical or corresponding parts throughout the several views, the invention is explained in more detail by means of exemplary embodiments and FIGS. 1 to 5.

FIG. 1 shows a perspective representation of a cooled wall part, in which a plurality of longitudinal cooling ducts 2 running parallel to the inner wall 1 are arranged near the inner wall 1. These longitudinal cooling ducts 2 are connected to one another via intermediate ribs 3. There is arranged at the downstream end of each of the cooling ducts 2 a deflecting device 4, for example a curved plate, via which the longitudinal cooling ducts 2 are connected in each case to backflow cooling ducts 6. The backflow cooling ducts 6 are arranged near the outer wall 5 of the cooled wall part and are limited on their underside by the intermediate ribs 3. Arranged in the middle of the intermediate ribs 3 at right angles to the inner wall 1, in each backflow cooling duct 6, are a multiplicity of small tubelets 7 which make a transverse connection of the backflow duct 6 to the inner wall 1.

Figure 2:
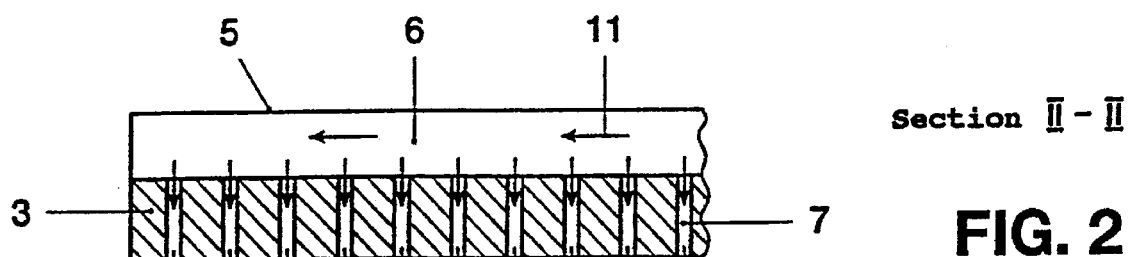
FIG. 2 shows a part longitudinal section through FIG. 1 in the plane II—II.
Figure 3:
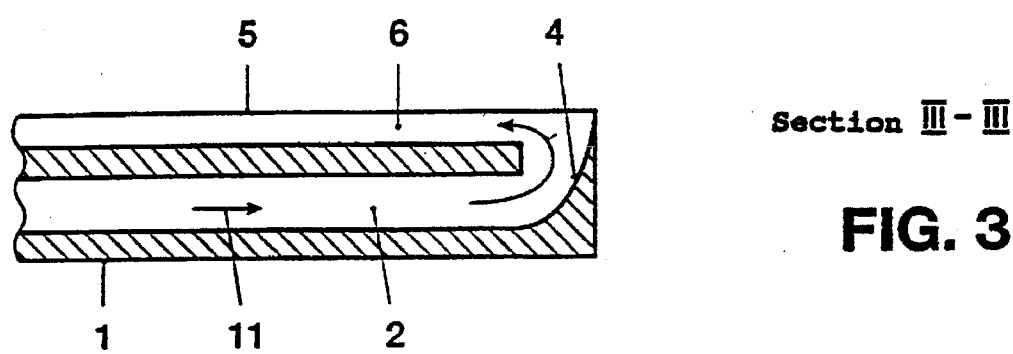
FIG. 3 shows a part longitudinal section through FIG. 1 in the plane III—III.

FIGS. 2 and 3 show part longitudinal sections through FIG. 1. FIG. 2 is a part longitudinal section in the plane of an intermediate wall 3 and of the tubelets 7, while FIG. 3 is a part longitudinal section in the plane of a longitudinal cooling duct 2.

The cooling method can be seen clearly from these Figures. According to FIG. 3, the cooling medium 11, for example air or vapor, passes first into the longitudinal cooling duct 2 and there cools the inner wall 1 of the wall part convectively. At the downstream end of the cooling duct 2, the flow of the cooling medium 11 is deflected through 180° by the deflecting device 4 to flow on the countercurrent principle into the backflow cooling duct 6. According to FIG. 2, a multiplicity of tubelets 7 branch off from the backflow cooling duct 6 at right angles to the inner wall 1 of the cooled wall part and extend through the intermediate rib 3 between the longitudinal cooling ducts 2. The cooling medium 11 now flows from the backflow duct 6 through these small tubelets 7 lined up close to one another and thus cools the intermediate rib 3 convectively. Effusion cooling may be referred to here, since the gaseous medium flows through a multiplicity of small orifices. On the inner wall 1 of the cooled wall part, the cooling medium 11 then forms a thin thermal insulating layer which reduces the heat load on the wall.

The effectiveness of the cooling is increased substantially by the multiple internal use of the cooling medium as a result of a combination of different cooling techniques (convective cooling, effusion cooling, film cooling) for the purpose of cooling a wall part subjected to thermal load.

Figure 4:
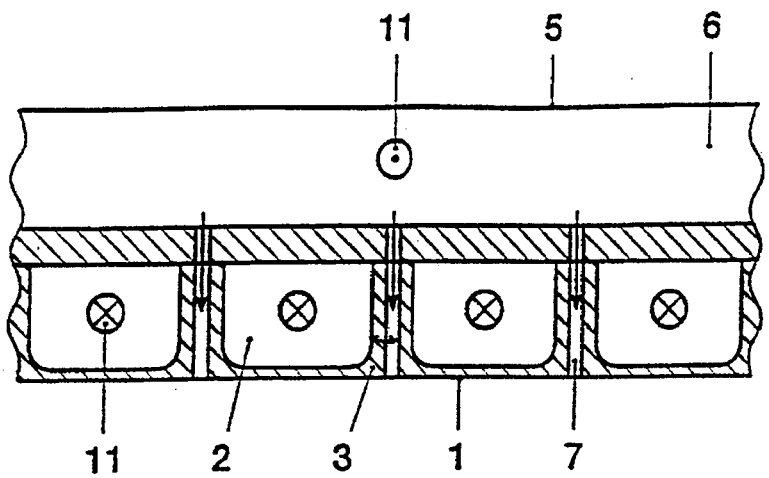
FIG. 4 shows a part cross section through a further embodiment.

Of course, the invention is not restricted to the above-mentioned exemplary embodiment. FIG. 4 shows, for example, a part cross section through a cooled wall part, in which there is not a plurality of backflow cooling ducts, but only one backflow cooling duct 6 in the form of an annular gap.

Figure 5A:
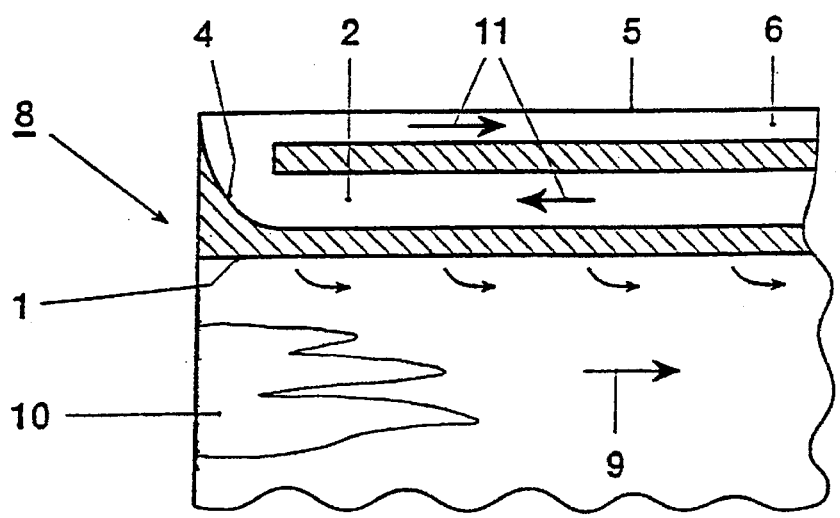
FIG. 5a shows a part longitudinal section through a combustion chamber, including the combustion chamber wall, in the plane of the effusion cooling.
Figure 5B:
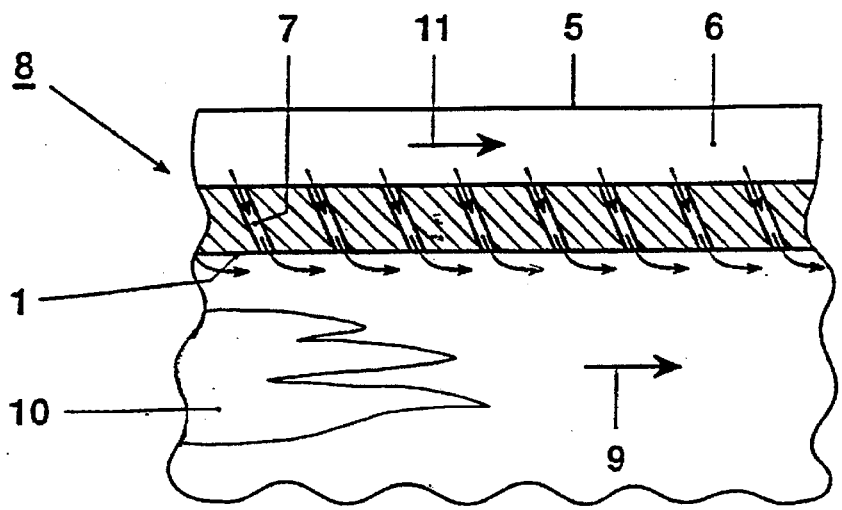
FIG. 5b shows a part longitudinal section through a combustion chamber, including the combustion chamber wall, in the plane of the convective cooling.

FIG. 5 represents part longitudinal sections through a gas turbine combustion chamber, FIG. 5a showing a section in the plane of a longitudinal cooling duct and FIG. 5b showing a section in the plane of the intermediate wall 3 and of the tubelets 7.

In this exemplary embodiment, the cooled wall part according to the invention constitutes a combustion chamber cooling brick 8. The combustion chamber wall 1 is first cooled convectively on the countercurrent principle, in which the cooling air 11 flows along in the longitudinal cooling duct 2 in the opposite direction to the combustion chamber flow 9. It is also possible, of course, to provide convective cooling on the cocurrent principle.

At the end of the cooling duct 2, a deflecting device 4 ensures that the cooling air experiences a change in direction. It flows, deflecting through 180°, into the backflow duct 6. According to FIG. 5b, the cooling air 11 now enters the tubelets 7 extending in the intermediate ribs 3. These tubelets 7 are distributed in the intermediate ribs 3 for the entire length of the cooling ducts 2 and ensure that the intermediate ribs 3 are cooled with a low air consumption.

In this exemplary embodiment, the tubes 7 are not arranged at right angles to the inner wall 1, but they form an acute angle with the direction of flow in the backflow duct 6, so that the cooling air 11 flows into the interior of the combustion chamber obliquely to the direction of flow of the combustion chamber flow 9. In this way, the film-cooling/insulating layer forming on the inner wall 1 experiences stronger adhesion than occurs, for example, in the case of a right-angled inflow of the cooling air into the combustion chamber interior. The oblique position of the tubelets depends on the intensity of the flow-related breakaway phenomenon of the cooling-air film formation.

The combustion chamber inner wall is thus cooled outstandingly with low air consumption, the thermal insulating layer substantially reducing the heat load on the wall. Moreover, there is abundant introduction with a good mixing of the air used for cooling purposes into the combustion chamber flow 9. Furthermore, in the case of premixing combustion, the insulating layer would have the advantage that the premixing flame 10 does not travel upstream in the flow boundary layer on the wall as far as the fuel spray-in point where it would burn in a diffusion-like manner.

Obviously, numerous modifications and variations of the present invention are possible in light of the above teachings. It is therefore to be understood that, within the scope of the appended claims, the invention may be practiced otherwise than as specifically described herein.

What is claimed is new and desired to be secured by Letters patent of the United States is:

1. A cooled wall part having an inner wall on a heat exposed side and an outer wall, and comprising:

a plurality of individual longitudinally directed cooling ducts disposed in a first plane parallel to and proximate the inner wall to guide a cooling medium along the inner wall from a first end to a second end of the wall part, a plurality of longitudinally extending ribs, each rib positioned between adjacent longitudinal cooling ducts, at least one backflow cooling duct disposed proximate the outer wall and in a second plane parallel to said first plane, and a deflecting device positioned at the second end of the longitudinal cooling ducts to direct cooling medium from the longitudinal cooling ducts into the at least one backflow cooling duct, wherein each of said plurality of ribs includes a plurality of tubelets extending from the backflow cooling duct through the inner wall to guide cooling medium from the backflow duct through the inner wall.

2. The cooled wall part as claimed in claim 1, wherein the tubelets are oriented in the intermediate ribs at right angles to the inner wall.

3. The cooled wall part as claimed in claim 1, wherein the tubelets are oriented in the intermediate ribs at an acute angle to the inner wall.

4. The cooled wall part as claimed in claim 1, wherein the wall part is a combustion chamber cooling brick and arranged so that a combustion chamber flow flows around the inner wall of the cooled wall part.

* * * * *